Jan. 25, 1966   H. HOFMANN   3,230,942
RECIPROCATING INTERNAL COMBUSTION ENGINE
Filed April 1, 1964   2 Sheets-Sheet 1

Inventor:
HANS HOFMANN
By K. A. Mayr
ATTORNEY

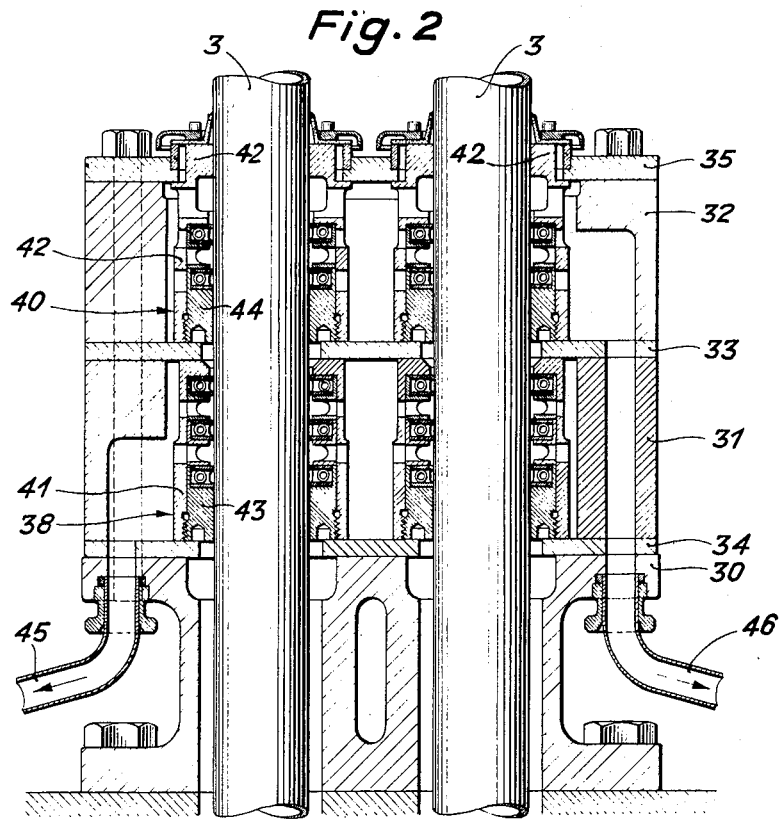
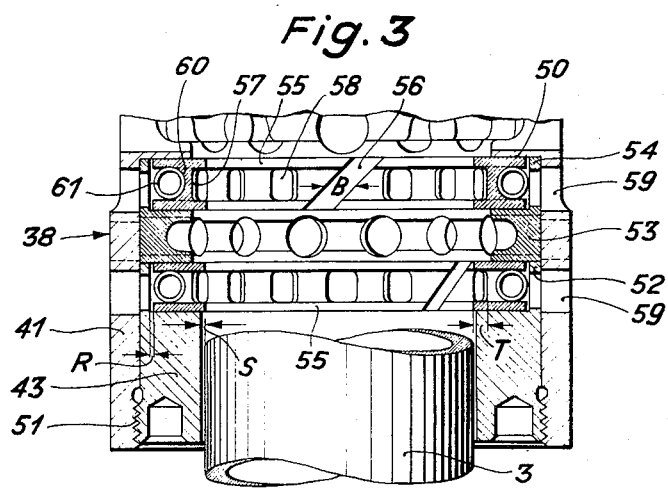

United States Patent Office 3,230,942
Patented Jan. 25, 1966

3,230,942
RECIPROCATING INTERNAL COMBUSTION
ENGINE
Hans Hofmann, Wiesendangen, Zurich, Switzerland, assignor to Sulzer Brothers Limited, Winterthur, Switzerland, a corporation of Switzerland
Filed Apr. 1, 1964, Ser. No. 356,538
Claims priority, application Switzerland, Apr. 5, 1963, 4,352/63
9 Claims. (Cl. 123—41.36)

The invention relates to a reciprocating internal combustion engine having pistons to and from which a cooling liquid is supplied and removed through tubes which move with the piston, the tubes extending through a gasket which does not move relatively to the engine casing.

In reciprocating internal combustion engines of this kind it is difficult to seal the coolant supply and remove tubes, more particularly since the same usually move transversely as well as axially, more particularly when the tubes are directly mounted in the piston, for the piston must have some clearance in the cylinder and, as it reciprocates, moves transversely of its axis within this clearance.

Conventionally, the tubes are sealed by means of gaskets or packing rings having sealing lips which are pressed against the tube by axial pressure applied to the gaskets. These gaskets, although completely satisfactory if correctly fitted and serviced, wear considerably and require frequent adjustment and replacement.

The invention obviates these disadvantages. According to the invention, the gasket has at least one ring having a cylindrical sliding surface facing the tube and plane end faces perpendicular to the tube axis. The sliding surface is provided with a recess in the form of an annular groove which communicates through suitable conduits with the outside of the ring.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 2 is a large scale longitudinal sectional view of the sealing means forming part of an engine of the kind illustrated in FIG. 1.

FIG. 3 is a large scale longitudinal sectional view of a portion of the sealing means shown in FIG. 2.

Figure 1:
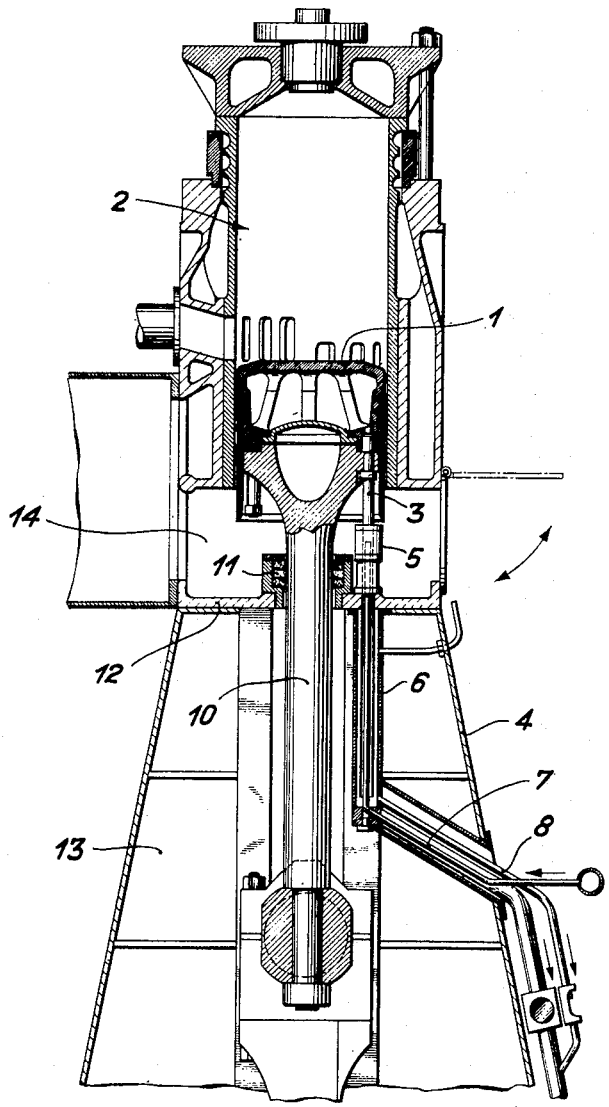
FIG. 1 is a longitudinal sectional view of a two-stroke diesel engine equipped with sealing means according to the invention.

Referring more particularly to FIG. 1 of the drawing, numeral 3 designates tubes secured to a piston 1 of an engine 2 for supplying and removing a liquid coolant, such as water. The tubes 3 extend, through packings 5 secured to an engine housing 4, into a tubular casing 6 whereto tubes 7 and 8 are connected for supplying the coolant by injection and for removing the coolant. The illustrated reciprocating internal combustion engine is of the kind wherein a piston rod 10 extends through a packing 11 mounted in a wall 12 which separates a crank chamber 13 from an air chamber 14 below the engine cylinder. The air chamber 14 contains air at superatmospheric pressure for scavenging and for charging the engine cylinder.

FIG. 2 is a view on an enlarged scale of the packing arrangement 5 indicated in FIG. 1. The arrangement 5 comprises a casing having parts 30, 31, 32 separated from one another by intermediate plates 33, 34. A plate 35 forms the top closure of the casing. Guide bushes 38, 40 extend around the tubes 3 in the casing. Each bush 38, 40 comprises an outer part 41, 42, respectively, and, screwed thereinto, an inner part 43, 44, respectively. The inner parts 43, 44 surround the tubes 3 with a small radial clearance S shown in FIG. 3 which facilitates axial movement of the tubes. The outer bush parts 41, 42 can be moved between the plates 33, 34 and 33, 35, respectively, radially of the tubes 3. Chambers formed between the bushes 38, 40 and the casing parts 31, 32, respectively, are provided with drain pipes 45, 46.

FIG. 3 shows the lower part of the bush 38 on an enlarged scale. The outside part 41 has an inwardly projecting shoulder 50 at one end and an internal screw thread 51 at its other end. A matching external screw thread of the part 43 is screwed into the screw thread 51. The part 43 has an annular axial projection 52 abutting a spacer ring 53 which has a similar annular axial projection 54 abutting the shoulder 50. The inner bush part 43 and the spacer ring 53 form annular recesses in which sealing rings 55 are displaceably received. Each ring 55 is split by a cut forming a slot 56 which is inclined with respect to the longitudinal axis of the packing as is done with piston rings. The inside of each ring 55 facing the tube 3 is provided with an annular recess 57 which communicates with the outside of the ring through apertures 58. The outer bush part 41 is provided with apertures 59 at the level of the apertures 58. An annular groove 60 is provided at the outside of each ring 55, receiving an annular coil spring 61. The recesses receiving the rings 55 are so devised that the radial clearance R between the rings and the projections 52, 54 is greater than the radial clearance S between the bushes and the tube 3. The rings 55 are made of a material having good running properties and being sufficiently deformable to be permanently pressed against the tube by the springs 61. Materials best suited for meeting these requirements are plastics, more particularly one commercially available under the name Delrin. Another advantage of using plastics is that the rings, although of one-piece construction, can be opened so far that they can be pulled over the tube 3 when assembling the packing. In some cases rings consisting of two or more segments may be preferred.

The springs 61 slightly and permanently press the rings 55 against the tubes 3. The bottom surface of the bottom ring 55 seals off the clearance between the tube 3 and the inner bush part 43. The coolant which inevitably adheres to the tube, which, in the described embodiment of the invention, is water which is brought up from below, is scraped off by the sharp edges of the first ring 55 and of the subsequent rings 55. The scraped-off water flows outward through the apertures 58, 59 and through corresponding apertures in the part 53. The rings above the intermediate plate 33 (FIG. 2) serve to scrape off the oil carried downward by the tube 3. The water and the oil are drained through pipes 45, 46, respectively, from the spaces around the bushes.

The rings 55 follow radial movements of the tubes 3 by movement within the bushes 38 and 40. When this movement exceeds the width of the clearance S, the tube 3 contacts the guiding bores of the inner bush parts 43 and 44 and the entire bushes are radially displaced between the respective plates 33 and 34 and 33 and 35. Since the clearance R is greater than the clearance S, the outside of the rings 55 can never contact the inside surfaces of the projections 52, 54. Therefore, the rings are pressed against the tube 3 only by the pressure provided by the springs 61 and never have to produce any guide effect, a function which is left to the bushes.

Preferably, the depth T (FIG. 3) of the recess 57 in the ring 55 is made greater than one third of the width B of the slot 56. Therefore, wear of the scraping edges of the rings 55 causes closing of the slot 56 and maintenance of upright position of the scraping edges throughout the life of the ring. The inclination of the slot 56 is such that the top and bottom edges of the slot overlap, as shown. When the ring is manufactured the internal diameter of the ring is substantially equal to the external diameter of the tube 3 whereby the ends of the slot 56 overlap. During operation the slot 56 is gradually closed by the force of the spring 61, due to wear of the ring. The spring 61 is of a size and design such as to provide just sufficient force to effect the required compression of the ring and to avoid excess pressure causing premature wear of the running surfaces of the ring 55. To effect good movability of the spring 61 in the groove 60 which is essential for the compression of the ring to take up the wear, the groove 60 has a semicircular cross section as shown, the radius of the semicircle being slightly greater than the radius of the spring 61. If the radius of the groove 60 is too great or if, for instance, the surface supporting the spring is flat and cylindrical, the individual windings of the spring 61 would press into the material of the ring, preventing free movement of the spring relative to the ring. To ensure uninhibited drainage of the scraped-off operating liquid, namely water and oil, the width of the apertures 58 is preferably made equal to or greater than the width of the webs between the apertures. For the same reason the depth of the groove 60 is made greater than the depth of the inner recess 57.

Because of the flat sharp-edged surfaces of the rings 55 running on the tube 3, the arrangement according to the invention provides improved performance and longer life than conventional arrangements. Servicing, such as, for example, periodic readjustment required by conventional packings, becomes unnecessary.

I claim:
1. In an internal combustion piston engine,
a piston having a hollow portion,
tubes connected to said piston and extending parallel with the longitudinal axis of the piston for conducting a coolant to and from the hollow portion of said piston,
stationary packings individually surrounding said tubes,
each packing comprising at least one sealing ring having a cylindrical inside surface coaxial of and facing said tube,
said cylindrical surface having an annular recess for receiving operating liquid adhering to said tube,
means in said sealing ring for communicating said annular recess with the outside of said ring, and
conduit means originating at the outside of said sealing ring for conducting operating liquid received in said recess away from the outside of said sealing ring.

2. In an internal combustion engine as defined in claim 1 wherein said ring is split.

3. In an internal combustion engine as defined in claim 1 wherein said ring is split, the opposed ends of the sealing ring being spaced for forming a slot, said slot being inclined with respect to the longitudinal axis of the packing and having ends overlapping one another.

4. In an internal combustion engine according to claim 3 wherein the width of said slot is smaller than the depth of said annular recess.

5. In an internal combustion piston engine,
a piston having a hollow portion,
tubes connected to said piston and extending parallel with the longitudinal axis of the piston for conducting a coolant to and from the hollow portion of said piston,
stationary packings individually surrounding said tubes,
each packing comprising at least one sealing ring having a cylindrical inside surface coaxial of and facing said tube,
said cylindrical surface having an annular recess for receiving operating liquid adhering to said tube,
means in said sealing ring for communicating said annular recess with the outside of said ring,
said sealing ring being elastic and split, the opposed ends of the sealing ring being spaced for forming a slot,
resilient means operatively connected to said sealing ring for compressing said sealing ring, and
conduit means originating at the outside of said sealing ring for conducting operating liquid received in said recess away from the outside of said sealing ring.

6. In an internal combustion engine as defined in claim 5 wherein the outside of said sealing ring has an annular recess and said resilient means is in the form of a coil spring placed in said last mentioned recess.

7. In an internal combustion engine,
a piston having a hollow portion,
tubes connected to said piston and extending parallel with the longitudinal axis of the piston for conducting a coolant to and from the hollow portion of the piston,
stationary packings individually surrounding said tubes,
each of said packings comprising at least one sealing ring extending around the respective tube, and
a bush radially movable relative to the respective tube and radially movably supporting said sealing ring,
said sealing ring having a cylindrical inside surface coaxial of and facing the respective tube,
said cylindrical surface having an annular groove receiving operating liquid adhering to the respective tube,
means in said sealing ring and in said bush for communicating said annular recess with the outside of said bush, and
conduit means originating at the outside of said bush for conducting operating liquid received in said recess away from said bush.

8. In an internal combustion engine as defined in claim 7, a first clearance between said bush and the respective tube permitting relative radial movement of said bush and the respective tube, and a second clearance between said sealing ring and said bush permitting relative radial movement of said sealing ring in said bush, said first clearance being smaller than said second clearance.

9. In an internal combustion piston engine,
a piston having a hollow portion,
tubes connected to said piston and extending parallel with the longitudinal axis of the piston for conducting a coolant to and from the hollow portion of said piston,
stationary packings individually surrounding said tubes,
each packing comprising at least one sealing ring having a cylindrical inside surface coaxial of and facing said tube,
said sealing ring being axially split and made of synthetic material, said cylindrical surface having an annular recess for receiving operating liquid adhering to said tube,
means in said sealing ring for communicating said annular recess with the outside of said ring, and
conduit means originating at the outside of said sealing ring for conducting operating liquid received in said recess away from the outside of said sealing ring.

References Cited by the Examiner

UNITED STATES PATENTS

| | | | |
|---|---|---|---|
| 1,073,197 | 9/1913 | Westinghouse | 123—41.35 |
| 2,657,678 | 11/1953 | Maybach | 123—41.36 |

FOREIGN PATENTS 337,025 4/1959 Switzerland.

KARL J. ALBRECHT, *Primary Examiner.*